No. 888,002. PATENTED MAY 19, 1908.
J. CSINCSAK.
FRYING PAN.
APPLICATION FILED NOV. 4, 1907.
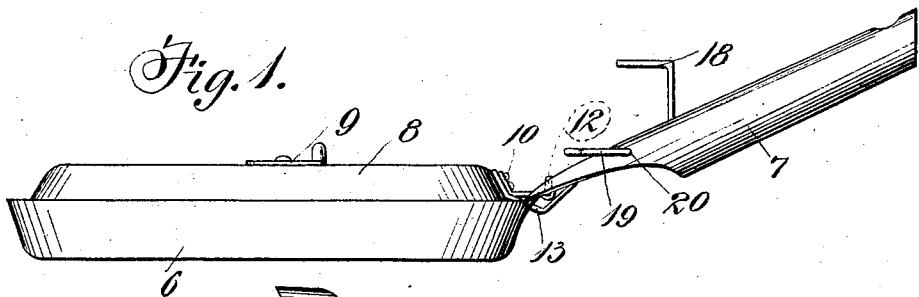
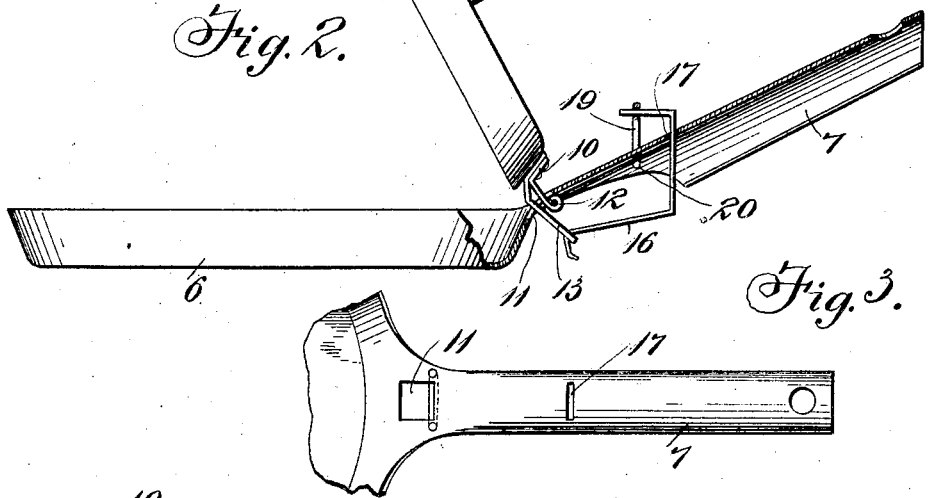
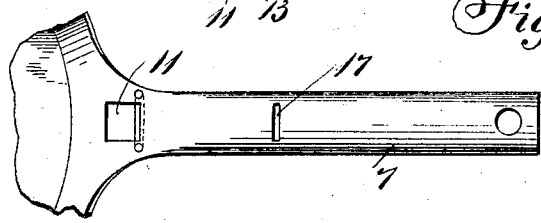
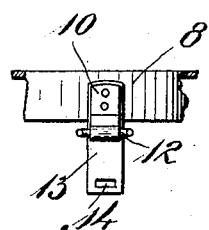
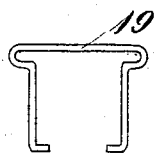
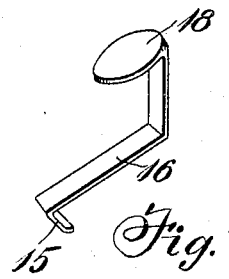
Inventor
John Csincsak

UNITED STATES PATENT OFFICE.

JOHN CSINCSAK, OF CHICAGO, ILLINOIS.

FRYING-PAN.

No. 888,002.　　Specification of Letters Patent.　　Patented May 19, 1908.

Application filed November 4, 1907. Serial No. 400,539.

*To all whom it may concern:*

Be it known that I, JOHN CSINCSAK, citizen of the United States, residing at Chicago, in the county of Cook and State of Illinois, have invented certain new and useful Improvements in Frying-Pans, of which the following is a specification.

This invention relates particularly to covers for frying pans, and embodies novel means for lowering and raising the same to open or close the cover, the object of the invention being to provide means which can be readily operated and which will hold the cover in open position when desired.

The invention is illustrated in the accompanying drawings, in which

Figure 1 is a side view of the pan with the cover closed. Fig. 2 is a similar view, partly in section, with the cover open. Fig. 3 is a detail in top plan view of part of the pan. Fig. 4 is a detail of the hinge of the cover. Fig. 5 is a detail of a catch for holding the cover open. Fig. 6 is a detail in perspective view of a thumb piece by means of which the cover is lifted.

Referring specifically to the drawings, 6 indicates the pan and 7 the handle, formed by pressing or stamping sheet metal, the handle being bent or curled to form a tube or hollow handle, in a known manner. The cover for the pan is indicated at 8 and has a vent controlled by a valve 9. The hinge piece 10 is riveted to one edge of the cover and extends through a slot 11 in the shank of the handle and is bent around a cross pin 12 fixed to the shank of the handle on the under side thereof, so that the cover may swing open or closed. The cover is also provided with a lever piece 13 secured thereto by the same rivets as the piece 10, and extending through the opening 11. The lower or outer end of the lever has an opening 14 which receives the hook tongue 15 on the end of an angular push piece 16, the upright arm of which extends through a retaining and guiding slot 17 formed in the handle 7. At the top, above the handle, the piece 16 has a thumb piece 18 to receive the pressure of the thumb. The handle is provided, adjacent to the push piece 16, with a latch 19 which has the form of a bail and which is pivoted at its ends in holes at 20 in the side of the handle, and which is arranged to catch over the thumb piece 18 when the same is depressed.

Normally the cover is closed, with the push piece 16 in raised position, as shown in Fig. 1. By pressing down on said piece the cover is swung open on its hinge, in consequence of the pressure on the lever 13, which lifts the cover to the position shown in Fig. 2, and it may be held in that position by catching the latch 19 over the thumb piece, as also shown in said figure. The cover will drop to closed position by slipping the latch off. The manipulation may be very quickly performed with one hand, to either lift or drop the cover, which will be very convenient, inasmuch as the other hand will be free to attend to the articles being cooked.

The invention is not limited to the particular form of the parts, which may be modified in various ways without departing from the scope of the invention claimed below.

I claim:

The combination with a pan having a handle with an opening in the shank thereof and a guide slot near the front end of the handle, a hinged cover having a lever extending through the opening and projecting under the handle, an angular push piece having an upright arm extending and movable vertically through the slot in the handle and connected at its lower end to the outer end of the lever and having a finger piece at the upper end of said arm, and a catch mounted on the handle and engageable with the push piece to hold the cover open.

In testimony whereof I affix my signature, in presence of two witnesses.

JOHN CSINCSAK.

Witnesses:
　NELLIE FELTSKOG,
　H. G. BATCHELOR.